United States Patent [19]

Alexander

[11] 4,089,813

[45] May 16, 1978

[54] MONOLITHIC CERAMIC CAPACITORS

[75] Inventor: John Henry Alexander, Bishops Stortford, England

[73] Assignee: ITT Industries, Incorporated, New York, N.Y.

[21] Appl. No.: 719,880

[22] Filed: Sep. 1, 1976

[30] Foreign Application Priority Data

Nov. 11, 1975 United Kingdom .............. 46520/75

[51] Int. Cl.$^2$ ............................................. H01B 1/08
[52] U.S. Cl. .................... 252/520; 252/521; 106/73.31; 252/63.5; 361/305
[58] Field of Search .................. 252/521, 520, 63.5; 106/73.3, 73.31; 361/305

[56] References Cited

U.S. PATENT DOCUMENTS

| | | | |
|---|---|---|---|
| 2,563,307 | 8/1951 | Burnham et al. | 106/73.31 |
| 2,992,929 | 7/1961 | Clement et al. | 106/73.31 |
| 3,256,499 | 6/1966 | Khouri et al. | 252/63.5 X |
| 3,757,177 | 9/1973 | Buehler | 361/305 X |
| 3,987,347 | 10/1976 | Burn | 252/63.5 |

*Primary Examiner*—Benjamin R. Padgett
*Assistant Examiner*—E. Suzanne Parr
*Attorney, Agent, or Firm*—John T. O'Halloran; Peter C. Van Der Sluys

[57] ABSTRACT

Base metal electrodes are used in ceramic capacitors with a dielectric material comprising barium titanate, barium oxide, magnesium ortho-titanate, calcium titanate, and barium, strontium or calcium zirconate.

8 Claims, No Drawings

MONOLITHIC CERAMIC CAPACITORS

BACKGROUND OF THE INVENTION

This invention relates in general to ceramic dielectric materials, and in particular to ceramic dielectrics suitable for firing with base metal electrodes in the preparation of the ceramic capacitors.

With the present trend towards miniaturization of electrical components a requirement has arisen for a miniature capacitor. This has resulted in a need for dielectric materials having a high dielectric constant, a high volume resistivity and a low power factor for permitting the construction of capacitors having a high energy density to volume ratio. These requirements have largely been set by dielectric materials of the barium titanate type wherein the materials are fired with precious metal electrodes to form the capacitor. This use of precious metal is however becoming increasingly more expensive.

The object of this invention is to minimize or to overcome this disadvantage.

SUMMARY OF THE INVENTION

According to the invention there is provided a ceramic dielectric material adapted to be fired with base metal electrodes so as to form a ceramic capacitor including a material fired from a mix containing from 85 to 88 mole percent barium titanate ($BaTiO_3$), 4 to 5 mole percent barium oxide (BaO), 1 to 1.5 mole percent magnesium ortho-titanate, 3 to 4.5 mole persent calcium titanate ($CaTiO_3$) and 3 to 4.5 mole percent barium, strontium or calcium zirconate.

DESCRIPTION OF THE PREFERRED EMBODIMENT

In a preferred embodiment a ceramic dielectric may be prepared from a mix containing:
  86.76 mole percent barium titanate,
  4.6 mole percent barium oxide,
  1.18 mole percent magnesium ortho-titanate,
  3.77 mole percent calcium titanate, and
  3.64 mole percent strontium zirconate ($SrZro_3$).

The constituents, which are in powder form, are wet milled together, pressed into capacitor blanks, provided with nickel or cobalt electrodes and are then fired in wet nitrogen at a temperature of 1370° to 1380° C for eight hours. The dielectric thus formed has a dielectric constant within the range 1700 to 2200, and has a loss factor of less than 2 percent.

In one embodiment of the invention a ceramic dielectric is prepared by firing a mix containing from 85 to 88 mole percent barium titanate ($BaTiO_3$), 4 to 5 mole percent barium oxide (BaO), 1 to 1.5 mole percent magnesium ortho-titanate ($Mg_2TiO_4$), 3 to 4.5 mole percent calcium titanate ($CaTiO_3$) and 3 to 4.5 mole percent barium, strontium or calcium zirconate. The mix is preformed into capacitor blanks, provided with nickel or cobalt electrodes and then fired in wet nitrogen to prevent oxidation of the electrodes. The nitrogen firing atmosphere may contain either from 2 to 10 mole percent of water vapor, or from 2 to 10 mole percent hydrogen together with twice the molar quantity of carbon dioxide. The firing temperature is advantageously between 1360° and 1390° C.

According to the invention there is also provided a ceramic dielectric material adapted to be fired with base metal electrodes to form a ceramic capacitor including a material fired from a mix containing:
  86.76 mole percent barium titanate,
  4.6 mole percent barium oxide,
  1.18 mole percent magnesium ortho-titanate ($Mg_2TiO_4$),
  3.77 mole percent calcium titanate, and
  3.64 mole percent strontium zirconate.

According to the invention there is further provided a process for preparing ceramic capacitors, including wet milling in powder form a mix containing 85 to 88 mole percent barium titanate, 4 to 5 mole percent barium, oxide, 1 to 1.5 mole percent magnesium ortho-titanate ($Mg_2TiO_4$), 3 to 4.5 mole percent calcium titanate, and 3 to 4.5 mole percent barium, strontium or calcium zirconate; pressing the wet milled powder into capacitor blanks or preforms; applying nickel to cobalt electrodes to the blanks; and firing the blanks at a temperature between 1360 and 1390° C in an atmosphere of nitrogen containing from 2 to 10 mole percent water or the elements of water.

It is to be understood that the foregoing description of specific examples of this invention is made by way of example only and is not to be considered as a limitation on its scope.

What is claimed is:

1. A ceramic dielectric material for use with base metal electrodes in a ceramic capacitor comprising:
   from 85 to 88 mole percent barium titanate ($BaTiO_3$);
   4 to 5 mole percent barium oxide (BaO);
   1 to 1.5 mole percent magnesium ortho-titanate;
   3 to 4.5 mole percent calcium titanate ($CaTiO_3$); and
   3 to 4.5 mole percent of a zirconate selected from the group consisting of barium, calcium and strontium.

2. A ceramic dielectric material for use with base metal electrodes to form a ceramic capacitor comprising:
   86.76 mole percent barium titanate;
   4.6 mole percent barium oxide;
   1.18 mole percent magnesium ortho-titanate ($Mg_2TiO_4$);
   3.77 mole percent calcium titanate; and
   3.64 mole percent strontium zirconate.

3. A process of preparing ceramic capacitors comprising the steps of:
   wet milling a mixture of powders consisting of 85 to 88 mole percent barium titanate, 4 to 5 mole percent barium oxide, 1 to 1.5 mole percent magnesium ortho-titanate ($Mg_2TiO_4$), 3 to 4.5 mole percent calcium titanate, and 3 to 4.5 mole percent barium, strontium or calcium zirconate;
   pressing the wet milled powders into capacitor blanks;
   applying nickel or cobalt electrodes to the blanks; and
   firing the blanks at a temperature between 1360° and 1390° C in an atmosphere of nitrogen containing from 2 to 10 mole percent water.

4. The process of claim 3 wherein the mixture comprises:
   86.76 mole percent barium titanate;
   4.6 mole percent barium oxide;
   1.18 mole percent magnesium ortho-titanate;
   3.77 mole percent calcium titanate; and
   3.64 mole percent strontium zirconate.

5. The process of claim 3 wherein the elements of water in the nitrogen atmosphere are present as hydrogen and carbon dioxide.

6. The process of claim 3 wherein the capacitor blanks are fired at a temperature between 1370° and 1380° C for a period of eight hours.

7. A ceramic capacitor comprising:
   at least two base metal electrodes; and
   a dielectric material intermediate said electrodes and consisting of 86.76 mole percent barium titanate, 4.6 mole percent barium oxide, 1.18 mole percent magnesium ortho-titanate ($MgTiO_4$), 3.77 mole percent calcium titanate, and 3.64 mole percent strontium zirconate.

8. The capacitor of claim 7 wherein said electrodes are selected from the group consisting of nickel and cobalt.

* * * * *